United States Patent [19]

Bessacini

[11] Patent Number: 5,216,815

[45] Date of Patent: Jun. 8, 1993

[54] METHOD OF PASSIVE RANGE DETERMINATION USING ONLY TWO BEARING MEASUREMENTS

[75] Inventor: Anthony F. Bessacini, Narragansett, R.I.

[73] Assignee: The United States of America as represented by the Secretary of the Navy, Washington, D.C.

[21] Appl. No.: 769,685

[22] Filed: Oct. 2, 1991

[51] Int. Cl.$^5$ .............................................. G01C 3/00
[52] U.S. Cl. ...................................... 33/228; 33/701
[58] Field of Search .................. 33/228, 268, 701, 227, 33/232, 238, 239, 284; 235/61 NV

[56] References Cited

U.S. PATENT DOCUMENTS

| | | | |
|---|---|---|---|
| 441,974 | 12/1890 | Rapieff | 33/228 |
| 1,943,403 | 1/1934 | Watson | 33/239 |
| 2,520,943 | 9/1950 | Ludeman | 33/228 |
| 2,562,981 | 8/1951 | Bock | 33/238 |
| 2,570,298 | 10/1951 | Wheeler | 33/238 |
| 3,277,282 | 10/1966 | Kuhlenkamp | 33/238 |
| 3,386,172 | 6/1968 | Wossagk | 33/238 |

Primary Examiner—C. W. Fulton
Attorney, Agent, or Firm—Michael J. McGowan; Prithvi C. Lall; Michael F. Oglo

[57] ABSTRACT

A method of determining range from a moving vessel to an approaching object using only two bearing measurements is provided. At a first point in time, a first bearing measurement to the approaching object is obtained using the vessel's conventional bearing sensor. The vessel and approaching object are then postulated to be on an intercept course based on the vessel's first velocity vector and first bearing measurement. At a second point in time, the vessel commences a maneuver to a known second velocity vector different from the first velocity vector. Then, at a third point in time, a second bearing measurement to the approaching object is obtained using the vessel's bearing sensor. At the same third point in time, a virtual bearing to the approaching object is provided as if the vessel and the approaching object were on the postulated intercept course. A time difference is computed between the second and third points in time and standard trigonometric methods are applied to determine the range to the approaching object. The determined range is accurate when the approaching object is on an actual intercept course.

9 Claims, 2 Drawing Sheets

5,216,815

METHOD OF PASSIVE RANGE DETERMINATION USING ONLY TWO BEARING MEASUREMENTS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to methods of range determination and more particularly to a method of passive range determination from a moving vessel to an approaching object using only two bearing measurements.

(2) Description of the Prior Art

Determining the range from a moving vessel to an approaching object has long been an important function of navigation and military systems. In terms of seagoing military vessels, a great deal of effort has been devoted to the development of motion analysis and ranging techniques that exclusively utilize passive sensors to generate bearing measurements to an approaching object. It is important to distinguish between two types of passive sensor systems. A first system utilizes spatial separation between hydrophone arrays (often referred to as a wide aperture array). The second system uses a "point-like" array (such as a submarine's spherical array) which hereinafter will be referred to as a conventional array. Since most submarines do not have a wide aperture array, a multitude of methods have been developed for the conventional array. These methods are based on a fundamental requirement of four independent bearing measurements combined with a maneuver of one's own vessel in order to obtain a complete solution for the approaching object (i.e., range, course, speed and bearing). Other techniques, such as Ekelund ranging, require both bearing and bearing rate (i.e., a series of bearing measurements) on each of two legs of one's own course in order to estimate range to an approaching object.

Using a conventional passive bearing sensor, current methods require more than one bearing measurement on each of two vessel legs for range determination. Unfortunately, if the approaching object is on a possible intercept course, e.g. a torpedo, time is of the essence with respect to determining range. Thus, while the aforementioned range determination methods achieve solutions, they do not arrive at a solution to the range question quickly enough for certain time critical environments.

SUMMARY OF THE INVENTION

Accordingly, it is an object of the present invention to minimize the number of measurements and thereby the time required to determine the range from one's own vessel to an approaching target that is on a possible intercept course.

Another object of the present invention is to determine the range from one's own vessel to an approaching object using only conventional passive sensors.

Other objects and advantages of the present invention will become more obvious hereinafter in the specification and drawings.

In accordance with the present invention, a method of determining range from a moving vessel to an approaching object using only two bearing measurements is provided. It is assumed that the vessel is moving according to a known first velocity vector and is equipped with a conventional line-of-sight bearing sensor. At a first point in time, a first bearing measurement to the approaching object is obtained using the vessel's bearing sensor. The vessel and approaching object are then postulated to be on an intercept course based on the vessel's first velocity vector and first bearing measurement. At a second point in time after the first point in time, the vessel commences a maneuver to a known second velocity vector different from the first velocity vector. Then, at a third point in time after the second point in time, a second bearing measurement to the approaching object is obtained using the vessel's bearing sensor. At the same third point in time, a virtual bearing to the approaching object is provided as if the vessel and the approaching object were on the postulated intercept course. A time difference is computed between the second and third points in time and standard trigonometric methods are applied to determine the range to the approaching object. These methods use: 1) the first and second velocity vectors, 2) the computed time difference, and 3) the virtual bearing and second bearing measurement. The determined range is accurate when the approaching object is on an actual intercept course.

BRIEF DESCRIPTION OF THE DRAWING(s)

FIGS. 1-3 are time sequenced, geometrical representations of a contact intercept scenario at first, second and third points in time, respectively.

DESCRIPTION OF THE PREFERRED EMBODIMENT

Figure 1:
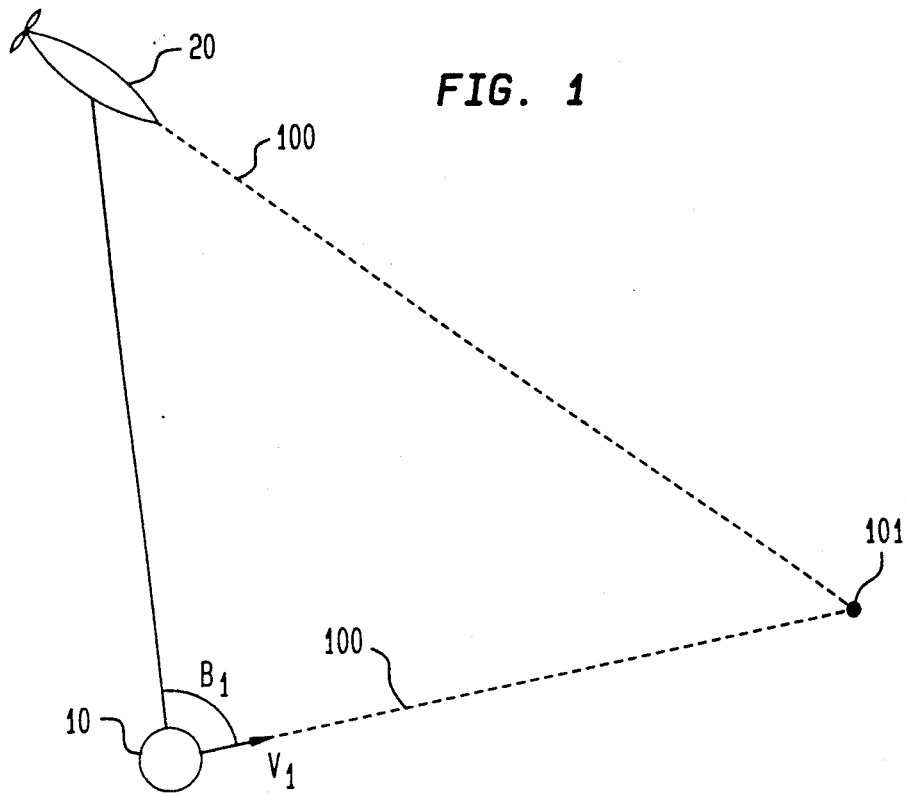
Figure 2:
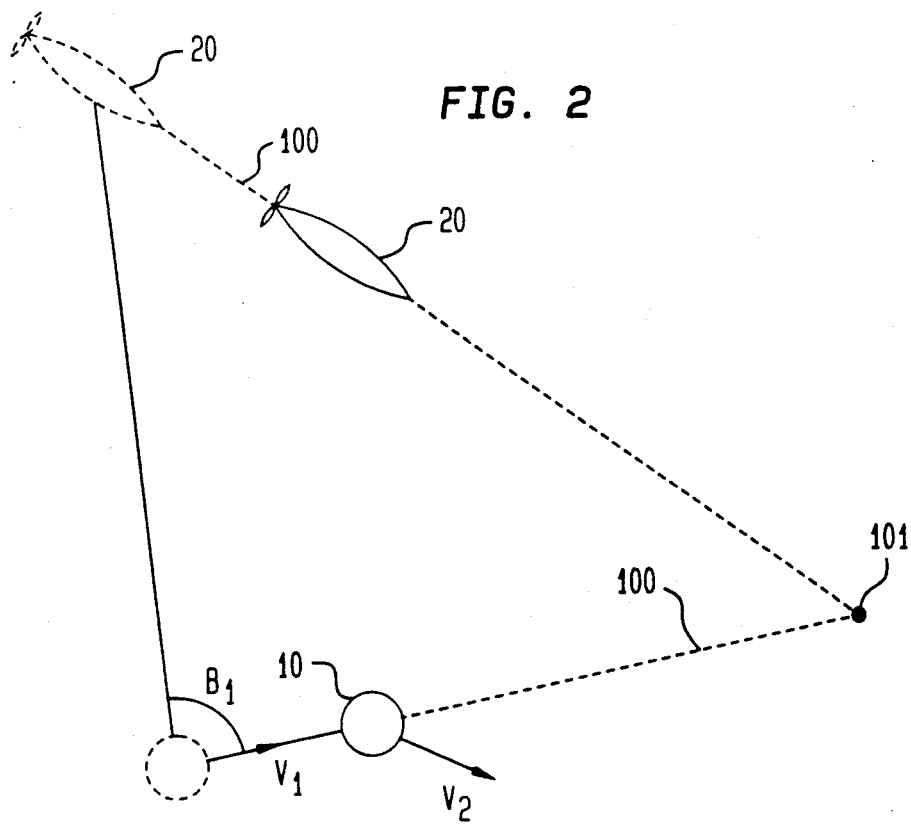
Figure 3:
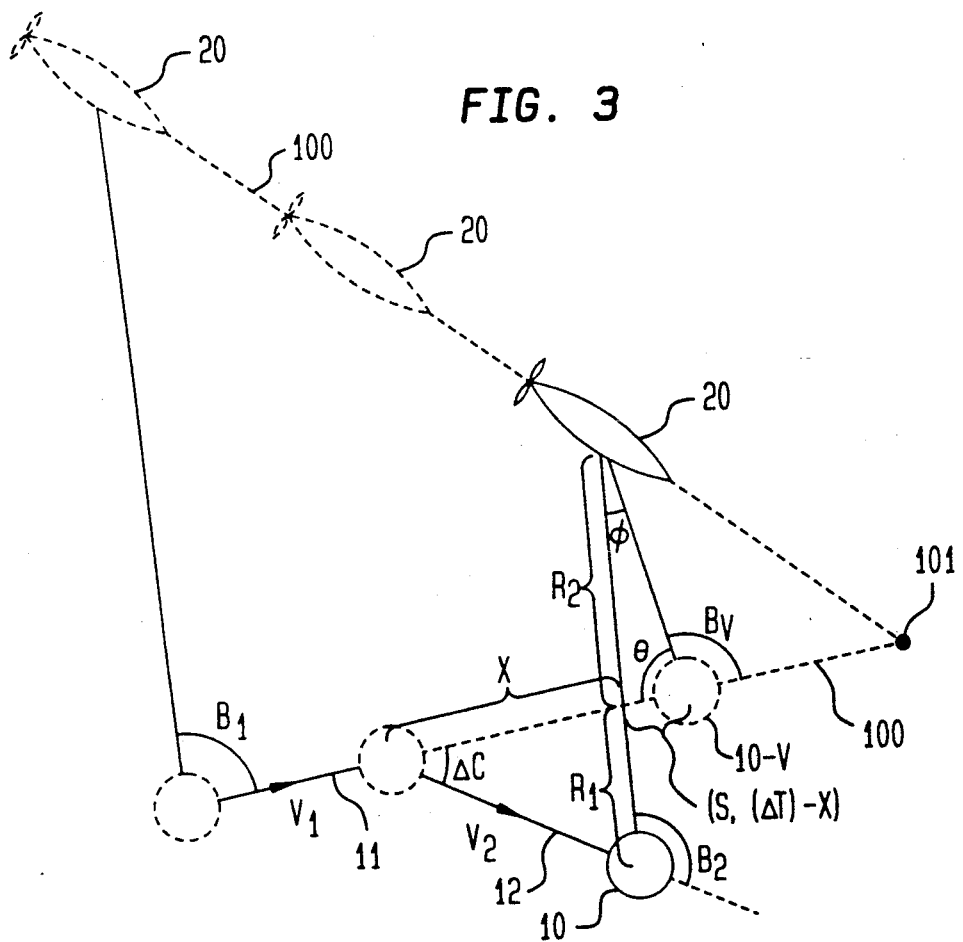

Referring now to the time sequenced drawings of FIGS. 1-3, a geometrical representation of a contact intercept scenario is shown and will be used to describe the method of the present invention. It is to be appreciated at the outset that this is only one of many possible scenarios as will be readily apparent to one skilled in the art. To facilitate an understanding of the present invention, it will be assumed that an observer platform 10 is a seagoing vessel (e.g., a ship or submarine) and that an approaching object 20 is a torpedo that may be on an intercept course with vessel 10. At the time vessel 10 first learns of the presence of torpedo 20, torpedo 20 is traveling according to an unknown course solution (i.e. range, course, speed and bearing). It is to be further appreciated that the method of the present invention is an accurate ranging method if torpedo 20 is on an actual intercept course with vessel 10 in which case the time required to determine range to torpedo 20 is of the essence. Note that while the accuracy of range determined by the present invention decreases if torpedo 20 is not on an actual intercept course, range determination in such a case is not as time critical and, accordingly will not be addressed here.

As shown in FIG. 1, vessel 10 is traveling according to a known velocity vector $V_1$ (i.e., shown in bold type to indicate the quantities of speed and direction) and has learned of the presence of a torpedo 20. In particular, vessel 10 would be equipped with a conventional passive, line-of-sight bearing sensor capable of obtaining a first bearing measurement $B_1$ with respect to $V_1$ at a first point in time. Using bearing measurement $B_1$, velocity vector $V_1$, and a postulated intercept course, as indicated by dashed lines 100, interception can be projected to occur at point 101. Postulated intercept course 100 is just that, postulated, since the actual course of torpedo 20 is unknown at this first point in time.

Referring now to FIG. 2, where time has incremented to a second point in time, vessel 10 has moved as shown according to velocity $V_1$ on a first leg of travel 11 and it is assumed that torpedo 20 has moved along postulated intercept course 100. Dotted line representations of vessel 10 and torpedo 20 indicate the positions of each at the first point in time. At the second point in time, vessel 10 commences a maneuver to a second known velocity vector $V_2$. Velocity vector $V_2$ is chosen to be different from velocity vector $V_1$ in terms of speed only, heading only or speed and heading. For the scenario being described, it will be assumed that both the speed and heading of vessel 10 are altered by the maneuver.

At a third point in time, as shown in the geometrical representation of FIG. 3, vessel 10 has moved according to $V_2$ on a second leg of travel 12 as shown. It is assumed that torpedo 20 continues to move along postulated intercept course 100. Once again, dotted line representations of vessel 10 and torpedo 20 are used to indicate the positions of each at both the first and second points in time. At the third point in time, a second bearing measurement $B_2$ to the actual position of torpedo 20 is obtained using the vessel's bearing sensor. Note that while the actual position of torpedo 20 need not reside on postulated intercept course 100 as shown, it will be assumed that this is the case since the method of the present invention develops a quick and accurate range determination for this critical situation. At this same third point in time, a virtual bearing $B_v$ is provided. Virtual bearing $B_v$ is the bearing that would have been measured by vessel 10 to torpedo 20 if both vessel 10 and torpedo 20 were still on the postulated intercept course 100 at the third point in time. In the geometrical representation, this would mean that a virtual vessel would be located on postulated intercept course 100 as indicated by the dotted line representation 10-V and would be moving according to velocity vector $V_1$. Furthermore, exploiting the "constant bearing to intercept" property of an intercept course, $B_v = B_1$.

The range to be determined by the present invention is the range between vessel 10 and torpedo 20 at the third point in time. The calculation of this range is based on standard trigonometric methods which are well known in the art. However, for purposes of illustration, the calculation of range for the scenario in FIG. 3 will now be described. It is to be understood that many geometries are possible based upon the actual velocity vectors $V_1$ and $V_2$ and that the equations that follow only apply for the given assumptions. Further, different forms of the equations can be written.

Specifically, the range R between vessel 10 and torpedo 20 at the third point in time in FIG. 3 can be divided into two segments:
(1) a segment, which will hereinafter be referred to as $R_1$, extending from vessel 10 to the vessel's postulated intercept course 100, and
(2) a segment, which will hereinafter be referred to as $R_2$, extending from the vessel's postulated intercept course 100 to torpedo 20.
Accordingly, $$R = R_1 + R_2 \quad (1)$$

As a first step, where $\Delta C$ is the vessel's heading change from leg 11 to leg 12;

$$\frac{R_1}{\sin(\Delta C)} = \frac{S_2 (\Delta T)}{\sin(B_2 - \Delta C)} \quad (2)$$

$S_2$ is the speed of the vessel on leg 12; and
$\Delta T$ is time difference between the second and third points in time.
Solving then for $R_1$, $$R_1 = \frac{S_2 (\Delta T)\sin(\Delta C)}{\sin(B_2 - \Delta C)} \quad (3)$$

Similarly, $$\frac{R_2}{\sin(\theta)} = \frac{S_1 (\Delta T) - X}{\sin(\phi)} \quad (4)$$

where $\sin(\theta) = \sin(180 - B_v) = \sin(180 - B_1) = \sin(B_1)$;

$\phi = (B_1 - B_2 + \Delta C)$; and $$X = \frac{S_2 (\Delta T)\sin(B_2)}{\sin(B_2 - \Delta C)} \quad (5)$$

Therefore, $$R_2 = \frac{(S_1 (\Delta T) - X)\sin(B_1)}{\sin(B_1 - B_2 + \Delta C)} \quad (6)$$

where $S_1$ is the speed of the vessel on leg 11. The above equations are true if $B_2 < 180°$ and if $(B_2 - \Delta C) < B_1$. The equations can be readily rewritten by one skilled in the art for any other geometry presented, e.g. a vessel turning toward the torpedo, according to the above described method.

The advantages of the present invention are numerous. By obtaining single bearing measurements before and after one's own vessel maneuver, and using the properties of a postulated intercept course, the method provides a means of performing a quick and accurate range determination for an approaching object on an actual intercept course. This capability has great utility in certain time critical environments, i.e., approaching torpedoes. Furthermore, the method can be used as a precursor to obtaining a complete solution (i.e., range, course, speed and bearing) with respect to the approaching object. Specifically, the vessel could obtain a third bearing measurement on the second leg of travel and calculate a second range to the approaching object. In this way, standard computational methods can make use of two bearings and two ranges to compute the complete solution.

As mentioned above, the method described is applicable to all contact geometries and maneuvers. The maneuver may consist of a change in speed, heading or speed and heading. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:
1. A method of determining range from a moving vessel to an approaching object, wherein the vessel is moving according to a known first velocity vector and is equipped with a conventional line-of-sight bearing sensor, said method comprising the steps of:

obtaining a first bearing measurement to the approaching object using the vessel's bearing sensor;

maneuvering the vessel according to a known second velocity vector different from the first velocity vector; and obtaining a second bearing measurement to the approaching object using the vessel's bearing sensor a known period of time after commencing said step of maneuvering, wherein said known period of time, the first and second velocity vectors, and said first and second bearing measurements, are indicative of the range to the approaching object if the approaching object is on an actual intercept course.

2. A method according to claim 1 wherein said step of maneuvering comprises the step of altering only the speed of the vessel.

3. A method according to claim 1 wherein said step of maneuvering comprises the step of altering only the heading of the vessel.

4. A method according to claim 1 wherein said step of maneuvering comprises the step of altering both the speed and heading of the vessel.

5. A method of determining range from a moving vessel to an approaching object, wherein the vessel is moving according to a known first velocity vector and is equipped with a conventional line-of-sight bearing sensor, said method comprising the steps of:

obtaining, at a first point in time, a first bearing measurement to the approaching object using the vessel's bearing sensor;

postulating that the vessel and approaching object are on an intercept course based on the vessel's first velocity vector and said first bearing measurement;

maneuvering, at a second point in time after said first point in time, the vessel to a known second velocity vector different from the first velocity vector;

obtaining, at a third point in time after said second point in time, a second bearing measurement to the approaching object using the vessel's bearing sensor;

providing, at said third point in time, a virtual bearing to the approaching object as if the vessel and the approaching object were on the postulated intercept course;

computing a time difference between said second and third points in time; and applying standard trigonometric methods to determine the range to the approaching object using: 1) the first and second velocity vectors, 2) said computed time difference, and 3) said virtual bearing and said second bearing measurement, whereby the determined range is accurate when the approaching object is on an actual intercept course.

6. A method according to claim 5 wherein said step of maneuvering comprises the step of altering only the speed of the vessel.

7. A method according to claim 5 wherein said step of maneuvering comprises the step of altering only the heading of the vessel.

8. A method according to claim 5 wherein said step of maneuvering comprises the step of altering both the speed and heading of the vessel.

9. A method according to claim 5 wherein a second range from the vessel to the object is determined while the vessel is on the known second velocity vector in order to determine a complete solution on the approaching object, the complete solution including information on range, course, speed and bearing of the approaching object, said complete solution determination comprising the steps of:

obtaining, at a fourth point in time after said third point in time, a third bearing measurement to the approaching object using the vessel's bearing sensor;

providing, at said fourth point in time, a virtual bearing to the approaching object as if the vessel and the approaching object were on the postulated intercept course;

computing a time difference between said second and fourth points in time;

applying standard trigonometric methods to determine the second range to the approaching object using: 1) the first and second velocity vectors, 2) said computed time difference between said second and fourth points in time, and 3) said virtual bearing and said third bearing measurement;

computing a time difference between said third and fourth points in time; and applying standard trigonometric methods to determine the complete solution on the approaching object using 1) the first computed range and its associated bearing 2) the second computed range and its associated bearing, and 3) the computed time difference between third and fourth point.

* * * * *